(12) United States Patent
Ogawa et al.

(10) Patent No.: US 8,102,640 B2
(45) Date of Patent: Jan. 24, 2012

(54) MONOLITHIC CERAMIC ELECTRONIC COMPONENT AND METHOD OF MANUFACTURING MONOLITHIC CERAMIC ELECTRONIC COMPONENT

(75) Inventors: Makoto Ogawa, Fukui (JP); Akihiro Motoki, Fukui (JP); Tatsuo Kunishi, Moriyama (JP); Shunsuke Takeuchi, Echizen (JP); Kenichi Kawasaki, Echizen (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 448 days.

(21) Appl. No.: 12/405,405

(22) Filed: Mar. 17, 2009

(65) Prior Publication Data

US 2009/0303656 A1    Dec. 10, 2009

(30) Foreign Application Priority Data

Jun. 10, 2008 (JP) .................. 2008-151784

(51) Int. Cl.
*H01G 4/228* (2006.01)
*H01G 4/06* (2006.01)
(52) U.S. Cl. ................... 361/306.3; 361/321.2
(58) Field of Classification Search .............. 361/301.4, 361/306.3, 306.2, 306.1, 321.3, 321.2
See application file for complete search history.

(56) References Cited

U.S. PATENT DOCUMENTS

| | | | | |
|---|---|---|---|---|
| 4,637,862 A * | 1/1987 | Eesley et al. | .................. | 205/109 |
| 5,866,196 A * | 2/1999 | Ueno et al. | ...................... | 427/79 |
| 6,960,366 B2 | 11/2005 | Ritter et al. | | |
| 6,972,942 B2 | 12/2005 | Ritter et al. | | |
| 6,982,863 B2 | 1/2006 | Galvagni et al. | | |
| 7,067,172 B2 | 6/2006 | Ritter et al. | | |
| 7,152,291 B2 | 12/2006 | Ritter et al. | | |
| 7,154,374 B2 | 12/2006 | Ritter et al. | | |
| 7,161,794 B2 | 1/2007 | Galvagni et al. | | |
| 7,177,137 B2 | 2/2007 | Ritter et al. | | |
| 7,344,981 B2 | 3/2008 | Ritter et al. | | |
| 7,345,868 B2 * | 3/2008 | Trinh | .................. | 361/306.3 |
| 7,463,474 B2 | 12/2008 | Ritter et al. | | |
| 2005/0046536 A1 * | 3/2005 | Ritter et al. | ................... | 336/200 |
| 2007/0014075 A1 | 1/2007 | Ritter et al. | | |
| 2008/0081200 A1 | 4/2008 | Katsube et al. | | |

(Continued)

FOREIGN PATENT DOCUMENTS

CN            101189693 A      5/2008

(Continued)

OTHER PUBLICATIONS

Iwanaga et al.; "Multilayer Ceramic Electronic Component and Method for Producing Same"; U.S. Appl. No. 12/405,372, filed Mar. 17, 2009.
Iwanaga et al.; "Monolithic Ceramic Electronic Component and Method for Manufacturing the Same"; U.S. Appl. No. 12/405,370, filed Mar. 17, 2009.

(Continued)

*Primary Examiner* — Eric Thomas
*Assistant Examiner* — David M Sinclair
(74) *Attorney, Agent, or Firm* — Keating & Bennett, LLP (57) ABSTRACT

A monolithic ceramic electronic component includes a laminate including a plurality of stacked ceramic layers and a plurality of internal electrodes extending between the ceramic layers and also includes external electrodes disposed on the laminate. The internal electrodes are partly exposed at surfaces of the laminate and are electrically connected to each other with the external electrodes. The external electrodes include first plating layers and second plating layers. The first plating layers are in direct contact with the internal electrodes. The second plating layers are located outside the first plating layers and contain glass particles dispersed therein.

7 Claims, 4 Drawing Sheets

U.S. PATENT DOCUMENTS

| | | |
|---|---|---|
| 2008/0123248 A1 | 5/2008 | Kunishi et al. |
| 2008/0123249 A1 | 5/2008 | Kunishi et al. |
| 2008/0158774 A1 | 7/2008 | Trinh |
| 2009/0268372 A1* | 10/2009 | Ogawa et al. .............. 361/306.3 |

FOREIGN PATENT DOCUMENTS

| | | |
|---|---|---|
| JP | 63-169014 A | 7/1988 |
| JP | 05-343259 A | 12/1993 |
| WO | WO 2007049456 A1 * | 5/2007 |

OTHER PUBLICATIONS

Ogawa et al.; "Ceramic Electronic Component and Method for Manfacturing the Same"; U.S. Appl. No. 12/405,399, filed Mar. 17, 2009.

Ogawa et al.; "Ceramic Electronic Component and Method for Manfacturing the Same"; U.S. Appl. No. 12/356,561, filed Jan. 21, 2009.

Official Communication issued in corresponding Chinese Patent Application No. 200910004653.6, issued on Mar. 2, 2011.

* cited by examiner

MONOLITHIC CERAMIC ELECTRONIC COMPONENT AND METHOD OF MANUFACTURING MONOLITHIC CERAMIC ELECTRONIC COMPONENT

BACKGROUND OF THE INVENTION

1. Field of the Invention

The present invention relates to monolithic ceramic electronic components and methods of manufacturing the monolithic ceramic electronic components. The present invention particularly relates to a monolithic ceramic electronic component including external electrodes formed by plating and a method of manufacturing the monolithic ceramic electronic component.

2. Description of the Related Art

Figure 4:
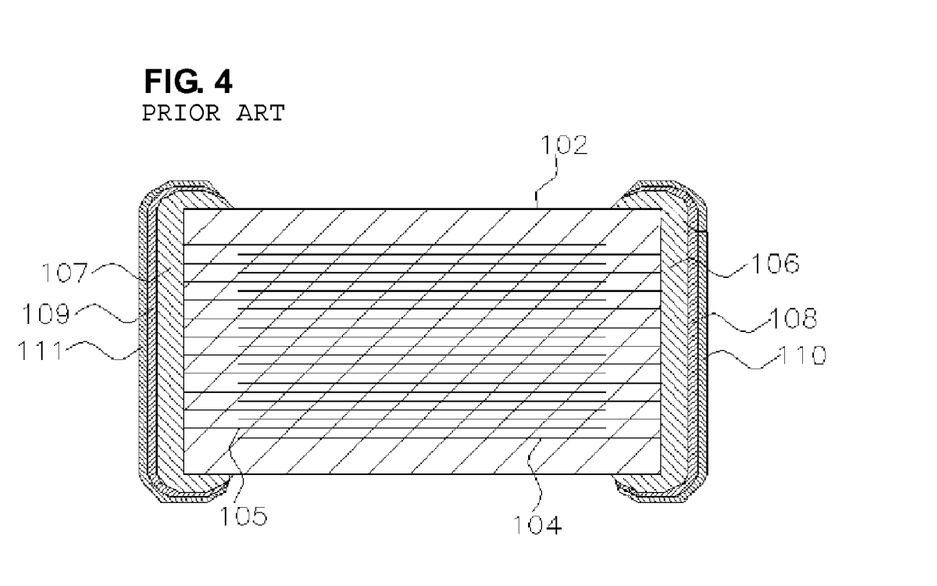
FIG. 4 is a sectional view of a conventional monolithic ceramic capacitor.

Conventional monolithic ceramic capacitors, which are typical monolithic ceramic electronic components, each include a laminate including a plurality of stacked dielectric ceramic layers and a plurality of laminar internal electrodes extending therebetween and also include a plurality of external electrodes. The internal electrodes are partly exposed at surfaces of the laminate and are electrically connected to each other with the external electrodes. FIG. 4 shows an exemplary conventional monolithic ceramic capacitor.

With reference to FIG. 4, a plurality of internal electrodes 104 and internal electrodes 105 are partly exposed at a first surface and a second surface, respectively, of a laminate 102. External electrodes are each disposed on the first or second surface of the laminate 102 such that the internal electrodes 104 and 105 are electrically connected to each other. A common method of forming the external electrodes is as described below. A metal paste containing a metal component and a glass component is applied onto the first and second surfaces of the laminate 102 and then baked, whereby paste electrode layers 106 and 107 are formed.

First plating layers 108 and 109 made of nickel are formed on the paste electrode layers 106 and 107, respectively. Second plating layers 110 and 111 made of tin are formed on the first plating layers 108 and 109, respectively. Therefore, the external electrodes each has a three-layer structure consisting of one of the paste electrode layers 106 and 107, one of the first plating layers 108 and 109, and one of the second plating layers 110 and 111.

Since the monolithic ceramic capacitor is soldered to a circuit board, the external electrodes need to have high wettability to solder. Furthermore, the external electrodes need to electrically connect the internal electrodes 104 and 105, which are electrically insulated from each other, to each other. The second plating layers 110 and 111, which are made of tin, have wettability to solder. The paste electrode layers 106 and 107 electrically connect the internal electrodes 104 and 105 to each other. The first plating layers 108 and 109 serve as bases for protecting the second plating layers 110 and 111 from solder erosion during soldering.

The paste electrode layers 106 and 107 have a large thickness of several ten to several hundred micrometers. Therefore, in order to adjust the size of the monolithic ceramic capacitor to a standard size, the effective volume of the monolithic ceramic capacitor that correlates with its capacitance needs to be reduced because the volume of the paste electrode layers 106 and 107 needs to be ensured. Since the first plating layers 108 and 109 and the second plating layers 110 and 111 have a small thickness of several micrometers, the monolithic ceramic capacitor can have an increased effective volume if the external electrodes include the first plating layers 108 and 109 and the second plating layers 110 and 111 only.

For example, Japanese Unexamined Patent Application Publication No. 63-169014 discloses a method in which conductive metal layers are deposited over side surfaces of a laminate by electroless plating such that internal electrodes which are arranged in the laminate and which are exposed at the side surfaces thereof are connected to each other.

According to the method disclosed in Japanese Unexamined Patent Application Publication No. 63-169014, external electrodes include plating layers only. Therefore, moisture may permeate the laminate through end portions of the plating layers. This results in the deterioration of lifetime properties of the laminate, the lifetime properties being evaluated by a high-temperature load test and a humidity load test.

SUMMARY OF THE INVENTION

In view of the above problems, preferred embodiments of the present invention provide a monolithic ceramic electronic component which includes external electrodes including plating layers and which has a good balance between high effective volume fraction and high reliability. In addition, other preferred embodiments of the present invention provide a method of manufacturing the monolithic ceramic electronic component.

A monolithic ceramic electronic component according to a preferred embodiment of the present invention includes a laminate including a plurality of stacked ceramic layers and a plurality of internal electrodes extending between the ceramic layers and also includes external electrodes disposed on the laminate.

The internal electrodes are partly exposed at surfaces of the laminate and are electrically connected to each other via the external electrodes. The external electrodes include first plating layers and second plating layers. The first plating layers are in direct contact with the internal electrodes. The second plating layers are located outside the first plating layers and contain glass particles dispersed therein.

The second plating layers are preferably formed by electroplating.

The second plating layers are preferably made of copper.

A method of manufacturing a monolithic ceramic electronic component according to a preferred embodiment of the present invention includes a step of preparing a laminate including a plurality of stacked ceramic layers and a plurality of internal electrodes which extend between the ceramic layers and which have end portions exposed at predetermined surfaces of the laminate and also includes a step of forming external electrodes on the predetermined surfaces of the laminate such that the exposed end portions of the internal electrodes are electrically connected to each other.

The external electrode-forming step includes a first sub-step of forming continuous plating layers in such a manner that plating deposits are provided on the exposed end portions of the internal electrodes and are then grown to be connected to each other and also includes a second sub-step of forming plating layers, containing glass particles dispersed therein, outside the continuous plating layers using a plating bath containing the glass particles.

The glass particle-containing plating layers are preferably formed by electroplating.

The external electrode-forming step preferably includes a third sub-step of heat-treating the glass particle-containing plating layers at a temperature higher than or equal to the softening point of the glass particles.

The glass particles contained in the plating bath are preferably coated with a silane coupling agent.

Since the external electrodes substantially contain the plating layers, the monolithic ceramic electronic component is excellent in effective volume fraction.

Since the second plating layers, which contain the glass particles, are located outside the first plating layers, which are in direct contact with the internal electrodes, the adhesion between the first plating layers and the ceramic layers is high. This prevents moisture from permeating the laminate through end portions of the first plating layers. This results in the enhancement of lifetime properties of the monolithic ceramic electronic component, the lifetime properties being evaluated by a high-temperature load test and a humidity load test.

Since the second plating layers, which contain the glass particles, are preferably formed by electroplating, the heat treatment of the second plating layers causes no blister. Therefore, the monolithic ceramic electronic component has excellent appearance properties.

According to the monolithic ceramic electronic component-manufacturing method, the glass particle-containing plating layers are formed using the plating bath containing the glass particles. This is very simple.

When the glass particle-containing plating layers are preferably formed by electroplating, the glass particles can be stably dispersed in the glass particle-containing plating layers because an electroplating solution used is more unlikely to dissolve the glass particles that electroless plating solutions.

Since the glass particle-containing plating layers are heat-treated at a temperature higher than or equal to the softening point of the glass particles, moisture can be securely prevented from penetrating the laminate. This allows the monolithic ceramic electronic component to have high reliability.

Since the glass particles contained in the plating bath are preferably coated with a silane coupling agent, the glass particles are electrically charged and therefore can be efficiently deposited during electroplating. Therefore, the content and/or distribution of the glass particles in the glass particle-containing plating layers can be readily controlled.

Other features, elements, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
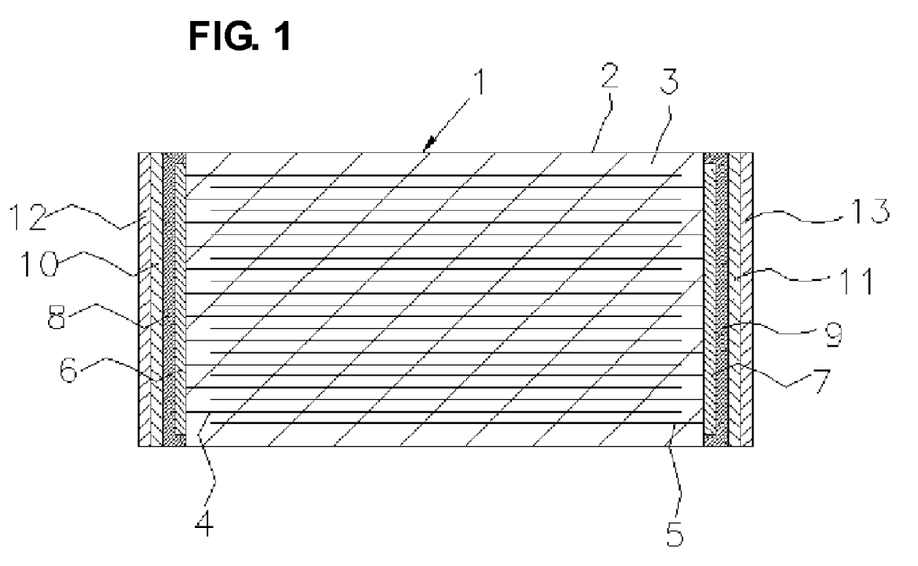
FIG. 1 is a sectional view of a monolithic ceramic capacitor that is an example of a monolithic ceramic electronic component according to a preferred embodiment of the present invention.

A monolithic ceramic electronic component according to a preferred embodiment of the present invention includes external electrodes including plating layers that are formed on a laminate without using any paste or without performing sputtering or vapor deposition. The monolithic ceramic electronic component has a unique feature in that other plating layers containing glass particles dispersed therein are placed outside those plating layers. FIG. 1 shows a monolithic ceramic capacitor 1 that is an example of the monolithic ceramic electronic component according to a preferred embodiment of the present invention.

With reference to FIG. 1, the monolithic ceramic capacitor 1 includes a laminate 2 including a plurality of stacked dielectric ceramic layers 3 and a plurality of internal electrodes 4 and 5 extending between the dielectric ceramic layers 3 and also includes external electrodes disposed on the laminate 2. The internal electrodes 4 are partly exposed at a first surface of the laminate 2 and are electrically connected to each other with one of the external electrodes. The internal electrodes 5 are partly exposed at a second surface of the laminate 2 and are electrically connected to each other with the other one of the external electrodes.

The external electrodes include first plating layers 6 and 7 disposed on the first surface and second surface, respectively, of the laminate 2. The first plating layers 6 and 7 preferably contain no glass particles. This is because a certain amount of glass particles prevent the growth of plating deposits. The first plating layers 6 and 7 are preferably made of copper or the like because copper is excellent in throwing power.

The first plating layers 6 and 7 are overlaid with second plating layers 8 and 9, respectively, containing glass particles 20 dispersed therein. The glass particles 20 are not shown in FIG. 1. When the second plating layers 8 and 9 entirely cover end portions of the first plating layers 6 and 7, moisture can be securely prevented from permeating the laminate 2 through the end portions of the first plating layers 6 and 7. Although the second plating layers 8 and 9 are disposed on the first plating layers 6 and 7 as shown in FIG. 1, other layers may be present therebetween.

The second plating layers 8 and 9 are overlaid with third plating layers 10 and 11, respectively. The third plating layers 10 and 11 serve as bases for preventing solder erosion during soldering and are formed as required. The third plating layers 10 and 11 are preferably made of nickel or other suitable material.

The third plating layers 10 and 11 are overlaid with fourth plating layers 12 and 13, respectively. The fourth plating layers 12 and 13 have wettability to solder and are formed as required. The fourth plating layers 12 and 13 are preferably made of tin or gold.

Figure 2:
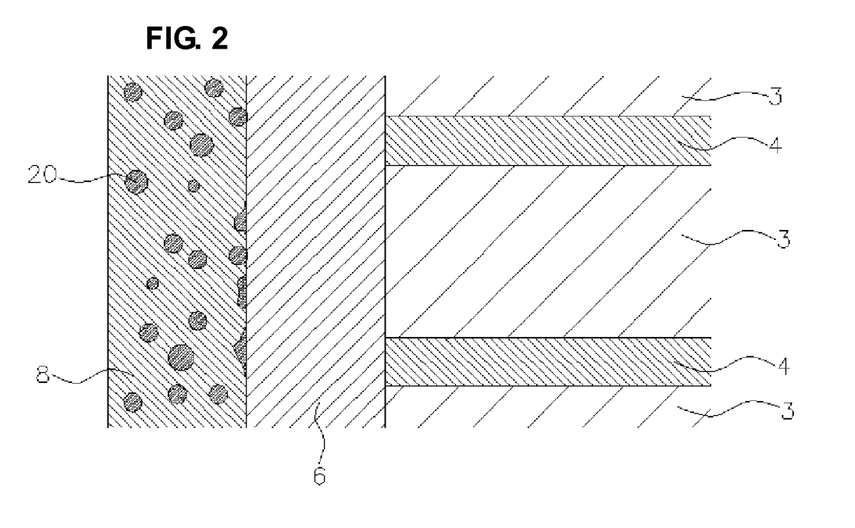
FIG. 2 is an enlarged view of a portion of a surface of a laminate included in the monolithic ceramic electronic component shown in FIG. 1.

FIG. 2 is an enlarged view of a portion of the first surface of the laminate 2. The first plating layer 6 and the second plating layer 8 are arranged on the first surface thereof in that order. The third plating layer 10 and the fourth plating layer 12 are not shown in FIG. 2.

With reference to FIG. 2, the glass particles 20 are dispersed in the second plating layer 8. The type of the glass particles 20 is not particularly limited. The glass particles 20 are made of, for example, B—Si glass. Examples of B—Si glass include B—Si—Bi glass, B—Si-alkali metal glass, B—Si-alkali metal-(Ti, Zr) glass, B—Si-alkaline earth metal glass, B—Si-alkali metal-alkaline earth metal glass, B—Si—Zn-alkali metal glass, and B—Si—Zn-alkaline earth metal glass. The glass particles 20 preferably have a size of, for example, about 0.01 μm to about 7 μm. The content of the glass particles 20 in the second plating layer 8 is preferably about 0.1% to about 20% by volume, for example.

The first plating layer 6 contains no glass particles as described above. However, some of the glass particles 20 may migrate into the first plating layer 6 to spread therein during heat treatment.

The first to fourth plating layers 6 to 13 may be formed by electroplating or electroless plating. In order to prevent the formation of blisters, the second plating layers 8 and 9 are preferably formed by electroplating.

The second plating layers 8 and 9, which contain the glass particles 20 dispersed therein, are preferably made of copper. This is because the glass particles 20 readily move in the second plating layers 8 and 9 and are likely to be uniformly dispersed therein during heat treatment.

Plating layer structures of the external electrodes, which are included in the monolithic ceramic electronic component, are described in the form of, for example, "first plating layer/second plating layer/third plating layer/...". In particular, the plating layer structures thereof are as follows: Cu/Cu (containing glass particles), Cu/Cu (containing glass particles)/Ni, Cu/Cu (containing glass particles)/Ni/Sn, Cu/Cu (containing glass particles)/Ni/Au, Cu/Ni (containing glass particles), Cu/Ni (containing glass particles)/Sn, Cu/Ni (containing glass particles)/Au, Ni/Ni (containing glass particles), Ni/Ni (containing glass particles)/Sn, Ni/Ni (containing glass particles)/Au, and so on.

A method of manufacturing a monolithic ceramic electronic component according to a preferred embodiment of the present invention will now be described using the monolithic ceramic capacitor shown in FIG. 1 as an example.

In the laminate 2 that is not subjected to plating, the internal electrodes 4 and 5 are partly exposed from the laminate 2 and are electrically insulated from each other. The laminate 2 is plated, whereby metal ions contained in a plating solution are deposited on exposed portions of the internal electrodes 4 and 5 to form plating deposits. The plating deposits are grown, whereby the plating deposits lying on the exposed portions of the internal electrodes 4 adjacent to each other are connected to each other and the plating deposits lying on the exposed portions of the internal electrodes 5 adjacent to each other are connected to each other. All the plating deposits are grown as described above, whereby the first plating layer 6 is uniformly and densely formed on the first surface of the laminate 2 and the first plating layer 7 is uniformly and densely formed on the second surface thereof.

The second plating layers 8 and 9, which contain the glass particles 20 dispersed therein, are formed on the first plating layers 6 and 7, respectively. The second plating layers 8 and 9 can be formed by common electroplating or electroless plating because the first plating layers 6 and 7, which are uniform conductive bases, are present. A preferred electroplating process is described below in detail.

In the electroplating process, the laminate 2 including no external electrodes and a conductive medium are placed into a vessel equipped with power supply terminals, the vessel is immersed in a plating bath containing metal ions or a metal complex, and electricity is then applied to the vessel in such a state that the vessel is rotated, swung, or vibrated.

If the glass particles 20 are dispersed in the plating bath, the glass particles 20 are deposited simultaneously with the formation of the plating deposits by the supply of electricity. The glass particles 20 may be dispersed in the plating bath in such a manner that the plating bath is adequately stirred or in another manner. The concentration of the glass particles 20 in the plating bath is preferably about 0.5 g/L to about 50 g/L, for example.

The glass particles 20 are preferably coated with a silane coupling agent before the glass particles 20 are dispersed in the plating bath. This enhances the deposition efficiency of the glass particles 20, thereby allowing the glass particles 20 to be heavily deposited in the second plating layers 8 and 9. Therefore, the content of the glass particles 20 in the second plating layers 8 and 9 can be readily controlled and the distribution of the glass particles 20 can be increased. This is probably because the glass particles 20 coated with the silane coupling agent are positively charged.

The coating of the glass particles 20 coated with the silane coupling agent stabilizes the deposition behavior of the glass particles 20 because the coated glass particles 20 are prevented from being dissolved in the plating bath and therefore are hardly dissipated.

The second plating layers 8 and 9, which contain the glass particles 20, are heat-treated at a temperature higher than or equal to the softening point of the glass particles 20. This allows the glass particles 20 in the second plating layer 8 and those in the second plating layer 9 to migrate to the first plating layer 6 and the first plating layer 7, respectively. Therefore, sealing properties of end portions of the first plating layers 6 and 7 are enhanced.

If the second plating layers 8 and 9, which contain the glass particles 20, are formed by electroless plating and are then heat-treated, blisters are likely to be formed. However, the second plating layers 8 and 9 are formed by electroplating and are then heat-treated; hence, any blisters are hardly formed.

After the second plating layers 8 and 9 are formed, the third plating layers 10 and 11 and the fourth plating layers 12 and 13 are formed by a common plating process.

A monolithic ceramic capacitor 51 for comparison will now be described with reference to FIG. 3. This monolithic ceramic capacitor 51 is a comparative example of the present invention and is outside the scope of the present invention.

Figure 3:
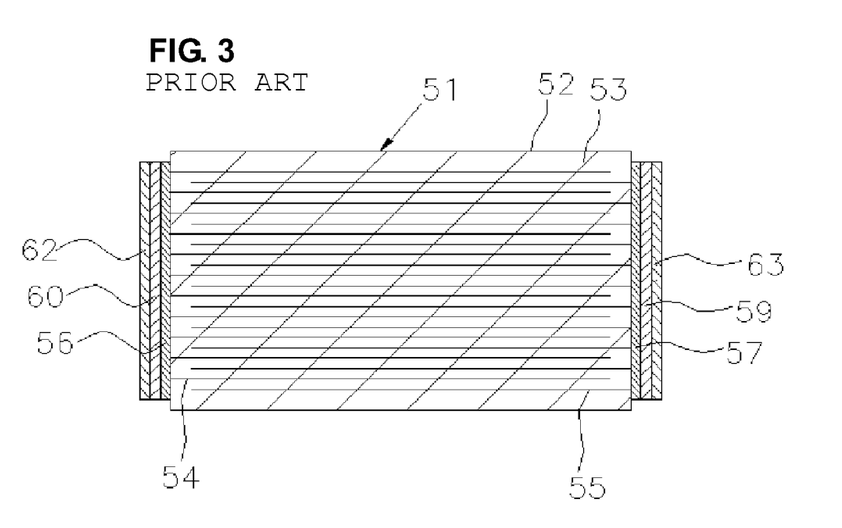
FIG. 3 is a sectional view of a comparative monolithic ceramic capacitor including plating layers containing no glass particles.

With reference to FIG. 3, this monolithic ceramic capacitor 51 includes a laminate 52 including a plurality of stacked dielectric ceramic layers 53 and a plurality of internal electrodes 54 and 55 extending between these dielectric ceramic layers 53 and also includes external electrodes. These internal electrodes 54 are partly exposed at a first surface of this laminate 52 and are electrically connected to each other with one of these external electrodes. These internal electrodes 55 are partly exposed at a second surface of this laminate 52 and are electrically connected to each other with the other one of these external electrodes.

These external electrodes include first plating layers 56 and 57 disposed on the first surface and second surface, respectively, of this laminate 52. These first plating layers 56 and 57 are formed in such a manner that plating deposits are provided on exposed portions of these internal electrodes 54 and 55 and are then grown to be connected to each other such that uniform layers are formed.

These first plating layers 56 and 57 are overlaid with second plating layers 60 and 59, respectively. These second plating layers 60 and 59 serve as bases for preventing solder erosion during soldering and are formed as required. These second plating layers 60 and 59 are preferably made of nickel or the like.

These second plating layers 60 and 59 are overlaid with third plating layers 62 and 63, respectively. These third plating layers 62 and 63 have wettability to solder and are formed as required. These third plating layers 62 and 63 are preferably made of tin or gold.

These first to third plating layers 56, 57, 59, 60, 62, and 63 contain no glass particles. Although these second plating layers 60 and 59 extend over these first plating layers 56 and 57, respectively, moisture is likely to permeate this laminate 52 through end portions of these first plating layers 56 and 57.

A plating process for forming the first plating layers 6 and 7 makes use of the growth and malleability of the plating deposits. In the case where the first plating layers 6 and 7 are formed by electroplating or electroless plating, the distance between the internal electrodes 4 and 5 adjacent to each other is preferably 10 μm or less or 20 μm or less, respectively, because the plating deposits are readily grown to be connected to each other.

Before the first plating layers 6 and 7 are formed, the exposed portions of the internal electrodes 4 and the exposed portions of the internal electrodes 5 are preferably about 1 μm or less recessed from the first surface and second surface, respectively, of the laminate 2. When the distance from the top of the exposed portion of each internal electrode 4 to the first surface of the laminate 2 and the distance from the top of the exposed portion of each internal electrode 5 to the second surface thereof are greater than about 1 μm, it is difficult to supply electrons to the exposed portions of the internal electrodes 4 and 5 and therefore the plating deposits are unlikely to be formed. In order to reduce these distances, the first and second surfaces of the laminate 2 may be polished by sandblasting or barreling.

Alternatively, the exposed portions of the internal electrodes 4 and the exposed portions of the internal electrodes 5 may protrude from the first surface and second surface, respectively, of the laminate 2 before the laminate 2 is subjected to plating. This can be achieved by appropriately adjusting conditions for polishing the first and second surfaces of the laminate 2 by sandblasting or the like. If the first and second surfaces of the laminate 2 are polished, protrusions extend from the exposed portions of the internal electrodes 4 in parallel to the first surface of the laminate 2 and protrusions extend from the exposed portions of the internal electrodes 5 in parallel to the second surface thereof; hence, the plating deposits formed on the internal electrodes 4 and 5 adjacent to each other are prevented from being grown. In the case where the first plating layers 6 and 7 are formed by electroplating or electroless plating, the distance between the internal electrodes 4 and 5 adjacent to each other is preferably about 20 μm or less or about 50 μm or less, respectively, because the plating deposits are readily grown to be connected to each other.

The external electrodes of the monolithic ceramic capacitor 1 substantially include the first to fourth plating layers 6 to 13 only and may further include paste electrode layers that are not directly involved in connecting the internal electrodes 4 to each other or the internal electrodes 5 to each other. If the external electrodes thereof need to extend on surfaces next to the first or second surface of the laminate 2, the external electrodes may further include thick paste electrode layers. This allows the monolithic ceramic capacitor 1 to be readily soldered and effectively prevents moisture from permeating end portions of the first to fourth plating layers 6 to 13. It is efficient that the thick paste electrode layers are formed by baking in a step of heat-treating the second plating layers 8 and 9.

The preferred embodiments of the present invention are as described above with reference to FIGS. 1 and 2. Various modifications may be made within the scope of the present invention.

Typical examples of the monolithic ceramic electronic component are monolithic ceramic capacitors. Other examples of the monolithic ceramic electronic component include monolithic chip inductors and monolithic chip thermistors.

The monolithic ceramic electronic component may include ceramic layers having an electrically insulating function. A material for forming the ceramic layers is not particularly limited. The ceramic layers may be made of a dielectric ceramic material, a piezoelectric ceramic material, a semiconductor ceramic material, or a magnetic ceramic material.

The monolithic ceramic capacitor 1, which is shown in FIG. 1, includes those two external electrodes as described above and may further include one or more external electrodes. The monolithic ceramic capacitor 1 may include, for example, arrayed external electrodes.

EXAMPLES

Examples of preferred embodiments of the present invention will now be described.

Example 1

Laminates, to be plated, for monolithic ceramic capacitors were prepared. The laminates had a length of about 1.0 mm, a width of about 0.5 mm, and a thickness of about 0.5 mm. Each laminate included dielectric ceramic layers made of a barium titanate dielectric material and internal electrodes, made of nickel, extending therebetween. The dielectric ceramic layers disposed between the internal electrodes had a thickness of about 2 μm. The internal electrodes had a thickness of about 1 μm.

The laminate was dried and was then sandblasted with an abrasive such that the internal electrodes had exposed portions which protruded from two surfaces of the laminate and which had an average height of about 1 μm.

About 30 mL of the laminates were placed into a rotary barrel with a volume of about 300 mL. Furthermore, about 70 mL of solder balls with a diameter of about 0.7 mm were placed into the rotary barrel.

The rotary barrel was immersed in a pyrophosphate electroplating bath which was adjusted to a temperature of about 58° C. and a pH of about 8.7 and which contained Pyrosol available from Meltex Inc. A current of about 10 A was applied to the rotary barrel in such a state that the rotary barrel was rotated at about 20 rpm, whereby copper plating layers with a thickness of about 5 μm were formed on the two surfaces of each laminate.

The following particles were prepared: B—Si glass particles having a softening point of about 600° C. and an average size of about 1.1 μm. The glass particles were coated with an amine silane coupling agent.

The resulting glass particles were added to a pyrophosphate electroplating bath containing Pyrosol available from Meltex Inc. such that the concentration of the glass particles in the pyrophosphate electroplating bath was about 10 g/L. The pyrophosphate electroplating bath was adjusted to a temperature of about 58° C. and a pH of about 8.7 and was then stirred, whereby the glass particles were dispersed in the pyrophosphate electroplating bath, whereby a copper electroplating bath containing the glass particles was obtained.

The rotary barrel, which contained the laminates having the about 5-μm thick copper plating layers, was immersed in the copper electroplating bath, which contained the glass particles. A current of about 10 A was applied to the rotary barrel in such a state that the rotary barrel was rotated at about 20 rpm, whereby glass particle-containing copper plating layers with a thickness of about 4 μm were formed on the copper plating layers.

The resulting laminates were taken out of the rotary barrel, placed into a nitrogen atmosphere, heated to about 800° C. at a rate of about 50° C./minute, and then kept for about ten minutes.

The resulting laminates, which had the particle-containing copper plating layers, were placed into the rotary barrel again. The rotary barrel was immersed in a nickel plating Watt bath adjusted to a pH of about 4.2 and a temperature of about 60°

C. A current of about 10 A was applied to the rotary barrel in such a state that the rotary barrel was rotated at about 20 rpm, whereby nickel plating layers with a thickness of about 3.0 μm were formed on the glass particle-containing copper plating layers.

The rotary barrel, which contained the laminates having the nickel plating layers, was immersed in a tin plating bath, Sn-235, available from Dipsol Chemicals Co., Ltd., the tin plating bath being adjusted to a pH of about 5.0 and a temperature of about 33° C. A current of about 6 A was applied to the rotary barrel in such a state that the rotary barrel was rotated at about 20 rpm, whereby tin plating layers with a thickness of about 3.0 μm were formed on the nickel plating layers.

Monolithic ceramic capacitors were obtained as described above. The monolithic ceramic capacitors included no paste electrode layers but included the resulting laminates and external electrodes including the above plating layers.

One hundred of the monolithic ceramic capacitors were sampled. The external electrodes of the sampled monolithic ceramic capacitors were observed with an optical microscope. This confirmed that none of the external electrodes had any blister.

One hundred of the monolithic ceramic capacitors were subjected to an accelerated reliability test in such a manner that the monolithic ceramic capacitors were maintained at about 105° C. for about 100 hours while being supplied with a DC voltage of about 10 V. This confirmed that none of the resulting monolithic ceramic capacitors had an insulation resistance of about 1 MΩ or less and therefore was defective.

Example 2

Laminates to be plated were prepared. The laminates were the same as those prepared in Example 1.

The laminates were dried and were then sandblasted with an abrasive such that external electrodes had exposed portions which protruded from two surfaces of each laminate and which had an average height of about 1 μm.

About 30 mL of the laminates were placed into a rotary barrel with a volume of about 300 mL. Furthermore, about 70 mL of solder balls with a diameter of about 0.7 mm were placed into the rotary barrel.

The rotary barrel was immersed in a copper electroless plating bath which was adjusted to a temperature of about 40° C. and a pH of about 12.5 and which contained Thru-cup PEA available from Meltex Inc. The rotary barrel was rotated at about 6 rpm, whereby copper plating layers with a thickness of about 5 μm were formed on the two surfaces of each laminate.

Glass particles that were the same as those prepared in Example 1 were prepared. The glass particles were coated with an amine silane coupling agent.

The resulting glass particles were added to the same copper electro plating bath as Example 1 such that the concentration of the glass particles in the copper electro plating bath was about 10 g/L. The glass particles were dispersed in the copper electro plating bath.

The rotary barrel, which contained the laminates having the about 5-μm thick copper plating layers, was immersed in the copper electro plating bath, which contained the glass particles. A current of about 10 A was applied to the rotary barrel in such a state that the rotary barrel was rotated at about 20 rpm, whereby glass particle-containing copper plating layers with a thickness of about 4 μm were formed on the copper plating layers.

The resulting laminates were taken out of the rotary barrel, placed into a nitrogen atmosphere, heated to about 800° C. at a rate of about 50° C./minute, and then kept for about ten minutes.

The resulting laminates, which had the particle-containing copper plating layers, were placed into the rotary barrel again. The rotary barrel was immersed in a nickel plating Watt bath adjusted to a pH of about 4.2 and a temperature of about 60° C. A current of about 10 A was applied to the rotary barrel in such a state that the rotary barrel was rotated at about 20 rpm, whereby nickel plating layers with a thickness of about 3.0 μm were formed on the glass particle-containing copper plating layers.

The rotary barrel, which contained the laminates having the nickel plating layers, was immersed in a tin plating bath, Sn-235, available from Dipsol Chemicals Co., Ltd., the tin plating bath being adjusted to a pH of about 5.0 and a temperature of about 33° C. A current of about 6 A was applied to the rotary barrel in such a state that the rotary barrel was rotated at about 20 rpm, whereby tin plating layers with a thickness of about 3.0 μm were formed on the nickel plating layers.

Monolithic ceramic capacitors were obtained as described above. The monolithic ceramic capacitors included no paste electrode layers but included the resulting laminates and external electrodes including the above plating layers.

One hundred of the monolithic ceramic capacitors were sampled. The external electrodes of the sampled monolithic ceramic capacitors were observed with an optical microscope. This confirmed that none of the external electrodes had any blister.

One hundred of the monolithic ceramic capacitors were subjected to an accelerated reliability test in such a manner that the monolithic ceramic capacitors were maintained at about 105° C. for about 100 hours while being supplied with a DC voltage of about 10 V. This confirmed that none of the resulting monolithic ceramic capacitors had an insulation resistance of about 1 MΩ or less and therefore was defective.

Comparative Example

Laminates to be plated were prepared. The laminates were the same as those prepared in Example 1.

The laminates were dried and were then sandblasted with an abrasive such that external electrodes had exposed portions which protruded from two surfaces of each laminate and which had an average height of about 1 μm.

About 30 mL of the laminates were placed into a rotary barrel with a volume of about 300 mL. Furthermore, about 70 mL of solder balls with a diameter of about 0.7 mm were placed into the rotary barrel.

The rotary barrel was immersed in a pyrophosphate electroplating bath which was adjusted to a temperature of about 58° C. and a pH of about 8.7 and which contained Pyrosol available from Meltex Inc. A current of 10 A was applied to the rotary barrel in such a state that the rotary barrel was rotated at about 20 rpm, whereby copper plating layers with a thickness of about 5 μm were formed on the two surfaces of each laminate.

The resulting laminates were taken out of the rotary barrel, placed into a nitrogen atmosphere, heated to about 800° C. at a rate of about 50° C./minute, and then kept for about ten minutes.

The resulting laminates, which had the copper plating layers, were placed into the rotary barrel again. The rotary barrel was immersed in a nickel plating Watt bath adjusted to a pH of about 4.2 and a temperature of about 60° C. A current of about 10 A was applied to the rotary barrel in such a state that the rotary barrel was rotated at about 20 rpm, whereby nickel plating layers with a thickness of about 3.0 µm were formed on the copper plating layers.

The rotary barrel, which contained the laminates having the nickel plating layers, was immersed in a tin plating bath, Sn-235, available from Dipsol Chemicals Co., Ltd., the tin plating bath being adjusted to a pH of about 5.0 and a temperature of about 33° C. A current of about 6 A was applied to the rotary barrel in such a state that the rotary barrel was rotated at about 20 rpm, whereby tin plating layers with a thickness of about 3.0 µm were formed on the nickel plating layers.

Monolithic ceramic capacitors were obtained as described above. The monolithic ceramic capacitors included the resulting laminates and external electrodes including the above plating layers. One hundred of the monolithic ceramic capacitors were sampled. The external electrodes of the sampled monolithic ceramic capacitors were observed with an optical microscope. This confirmed that none of the external electrodes had any blister.

One hundred of the monolithic ceramic capacitors were subjected to an accelerated reliability test in such a manner that the monolithic ceramic capacitors were maintained at about 105° C. for about 100 hours while being supplied with a DC voltage of about 10 V. This confirmed that all the resulting monolithic ceramic capacitors had an insulation resistance of about 1 MΩ or less and therefore were defective.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A monolithic ceramic electronic component comprising:
    a laminate including a plurality of stacked ceramic layers and a plurality of internal electrodes located between the ceramic layers; and
    external electrodes disposed on the laminate; wherein
    the internal electrodes are partly exposed at surfaces of the laminate and are electrically connected to each other via the external electrodes, the external electrodes include first plating layers and second plating layers, the first plating layers are in direct contact with the internal electrodes and contain either no glass particles dispersed therein or only glass particles that migrate from the second plating layers, and the second plating layers are located outside the first plating layers and contain glass particles dispersed therein.

2. The monolithic ceramic capacitor according to claim 1, wherein the second plating layers are made of electroplated material.

3. The monolithic ceramic capacitor according to claim 1, wherein the second plating layers are made of copper.

4. A method of manufacturing a monolithic ceramic electronic component, comprising:
    a step of preparing a laminate including a plurality of stacked ceramic layers and a plurality of internal electrodes which extend between the ceramic layers and which have end portions exposed at predetermined surfaces of the laminate; and
    a step of forming external electrodes on the predetermined surfaces of the laminate such that the exposed end portions of the internal electrodes are electrically connected to each other; wherein
    the external electrode-forming step includes a first sub-step of forming continuous plating layers, containing no glass particles dispersed therein, in such a manner that plating deposits are formed on the exposed end portions of the internal electrodes and are then grown to be connected to each other and also includes a second sub-step of forming plating layers, containing glass particles dispersed therein, outside the continuous plating layers using a plating bath containing the glass particles.

5. The method according to claim 4, wherein the glass particle-containing plating layers are formed by electroplating.

6. The method according to claim 4, wherein the external electrode forming step includes a third sub-step of heat treating the glass particle-containing plating layers at a temperature higher than or equal to the softening point of the glass particles.

7. The method according to claim 4, wherein the glass particles contained in the plating bath are coated with a silane coupling agent.

* * * * *